(12) United States Patent
Lee et al.

(10) Patent No.: US 9,831,512 B2
(45) Date of Patent: Nov. 28, 2017

(54) METHOD FOR ACTIVATING STACK OF FUEL CELL

(71) Applicants: Hyundai Motor Company, Seoul (KR); Kia Motors Corporation, Seoul (KR)

(72) Inventors: Jae Hyuk Lee, Gyeonggi-do (KR); Hyun Suk Choo, Gyeonggi-do (KR); Sung Keun Lee, Gyunggi-do (KR); Dae Keun Chun, Seoul (KR); Hwan Soo Shin, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 37 days.

(21) Appl. No.: 15/156,702

(22) Filed: May 17, 2016

(65) Prior Publication Data
US 2017/0040624 A1 Feb. 9, 2017

(30) Foreign Application Priority Data
Aug. 5, 2015 (KR) .................. 10-2015-0110537

(51) Int. Cl.
*H01M 8/04223* (2016.01)
*H01M 8/04302* (2016.01)
(Continued)

(52) U.S. Cl.
CPC ... *H01M 8/04302* (2016.02); *H01M 8/04225* (2016.02); *H01M 2008/1095* (2013.01)

(58) Field of Classification Search
CPC ......... H01M 8/04753; H01M 8/04559; H01M 8/04223
See application file for complete search history.

(56) References Cited

U.S. PATENT DOCUMENTS

2005/0118466 A1 6/2005 Lee
2007/0286142 A1 12/2007 Prakash et al.
(Continued)

FOREIGN PATENT DOCUMENTS

KR 10-0513541 B1 9/2005
KR 2009-0028579 A 3/2009
(Continued)

*Primary Examiner* — Stewart Fraser
*Assistant Examiner* — Olatunji Godo
(74) *Attorney, Agent, or Firm* — Mintz Levin Cohn Ferris Glovsky and Popeo, P.C.; Peter F. Corless

(57) ABSTRACT

A method for activating a stack of a fuel cell is provided. The method includes supplying oxygen and hydrogen to the stack after starting an activation process to change the stack to an open circuit voltage (OCV) state and terminating the supply. Adjacent cells of the stack are electrically connected by a cell voltage sensing terminal board and the adjacent cells are shorted to allow a cell voltage to be 0V. Additionally, oxygen and hydrogen are resupplied to the stack and predetermined current density is applied for a predetermined time is executed. The voltage is again decreased to be 0V by applying current density exceeding the predetermined current density for a time exceeding the predetermined time through the open circuit voltage state to remove oxygen remaining in the stack. Oxygen and hydrogen are resupplied after a silent period has elapsed for a predetermined time after removing the remaining oxygen.

9 Claims, 2 Drawing Sheets

(51) Int. Cl.
    *H01M 8/04225*   (2016.01)
    *H01M 8/1018*    (2016.01)

(56) References Cited

U.S. PATENT DOCUMENTS

| | | |
|---|---|---|
| 2007/0286151 A1 | 12/2007 | Prakash et al. |
| 2007/0286152 A1 | 12/2007 | Prakash et al. |
| 2008/0008111 A1 | 1/2008 | Prakash et al. |
| 2009/0286112 A1* | 11/2009 | Oh .................... H01M 8/04089 429/431 |
| 2010/0047650 A1 | 2/2010 | Iino et al. |
| 2012/0312371 A1 | 12/2012 | Rinzler et al. |

FOREIGN PATENT DOCUMENTS

| | | |
|---|---|---|
| KR | 2009-0031946 A | 3/2009 |
| KR | 10-2009-0119066 A | 11/2009 |
| KR | 2013-0086930 A | 8/2013 |
| KR | 10-1315762 B1 | 10/2013 |

* cited by examiner

METHOD FOR ACTIVATING STACK OF FUEL CELL

CROSS-REFERENCE TO RELATED APPLICATION

This application is based on and claims the benefit of priority to Korean Patent Application No. 10-2015-0110537, filed on Aug. 5, 2015 in the Korean Intellectual Property Office, the disclosure of which is incorporated herein in its entirety by reference.

TECHNICAL FIELD

The present disclosure relates to a method for activating a stack of a fuel cell, and more particularly, to a method for activating a stack of a fuel cell to reduce a processing time and an consumption amount of hydrogen by rapidly decreasing a stack voltage using an electrical short phenomenon between adjacent cells of the fuel cell and removing oxygen remaining in the stack.

BACKGROUND

In general, after a stack of a fuel cell is assembled and manufactured, since activity of the stack of the fuel cell in an electrochemical reaction is low upon initial driving, a process known as stack activation is performed to maximally secure normal initial performance of the stack of the fuel cell. An object of activation of the fuel cell known as pre-conditioning or break-in is to activate catalyst that is not involved in a reaction and to sufficiently hydrogenate an electrolyte membrane and electrolyte contained in an electrode to secure a hydrogen ion passage. More particularly, to exhibit performance of a normal state after the stack of the fuel cell is assembled, the stack activation process is performed with the object of securing an electrode reaction area of three-phases, removing impurities from a polymer electrolyte membrane or the electrode, and improving ion conductivity of the polymer electrolyte membrane.

In a method for activating a stack according to the related art described above, a pulse discharge configured in a high current density discharge and a shutdown state is performed repeatedly, and a process time is about 1.5 to 2 hours based on a 220 cell submodule. More particularly, the method for activating a stack according to the related art is performed by repeatedly performing a process in which high current density (e.g., 1.2 or 1.4 A/cm$^2$) is discharged for 3 minutes, and a process in which the pulse discharge is performed for 5 minutes in the shutdown state about 11 times.

However, in the activation process according to the related art using the above-mentioned pulse discharge, an amount of used hydrogen as well as a processing time is increased. In other words, the existing method for activating a stack using the pulse discharge in the shutdown state has an advantage that activation speed is increased by changing an internal water flow of the fuel cell. However, since the time required for the activation is about 105 minutes and an amount of used hydrogen is about 2.9 kilograms based on the 220 cell submodule, the processing time is increased and a consumption amount of hydrogen is increased.

SUMMARY

The present disclosure provides a method for activating a stack of a fuel cell, and more particularly, provides a method for activating a stack of a fuel cell for reducing a processing time and an consumption amount of hydrogen by rapidly dropping a stack voltage using an electrical short phenomenon between adjacent cells of the fuel cell and removing oxygen remaining in the stack.

According to an exemplary embodiment of the present disclosure, a method for activating a stack of a fuel cell may include supplying oxygen and hydrogen to the stack forming the fuel cell after starting an activation process in a fuel cell activation process to allow the stack to be an open circuit voltage (OCV) state and stopping the supply of oxygen and hydrogen; electrically connecting adjacent cells among a plurality of cells forming the stack by a cell voltage sensing terminal board and shorting the adjacent cells to allow a cell voltage to be 0V; again supplying oxygen and hydrogen to the stack after the second step and performing a preconditioning process of applying predetermined current density for a predetermined period of time; again decreasing the voltage to be 0V by applying current density exceeding the predetermined current density for a period of time exceeding the predetermined time through the open circuit voltage state to remove oxygen remaining in the stack; and again supplying oxygen and hydrogen after a silent period (e.g. shut down) has elapsed for a predetermined time after removing the remaining oxygen.

In addition, the predetermined current density may be set to about 0.6 to 1.0 A/cm$^2$, and the predetermined period of time may be set to about 10 to 60 seconds. The current density exceeding the predetermined current density may be set to about 1.0 to 1.4 A/cm$^2$, and the period of time exceeding the predetermined time may be set to about 30 to 180 seconds. The predetermined time resupply of oxygen and hydrogen may be set to about 30 to 300 seconds. In addition, the time shorting the cell voltage to be 0V may be set to be less than about 5 seconds. By repeating the decrease of voltage and resupply of oxygen and hydrogen processes about 11 times, an activation process time may become about 75 minutes, and a consumption amount of hydrogen may be reduced to about 1.7 kilograms. The cell voltage sensing terminal board may have a connecting part formed from a center to both ends to connect the adjacent cells to each other.

According to another exemplary embodiment of the present disclosure, a method for activating a stack of a fuel cell may include supplying oxygen and hydrogen to the stack forming the fuel cell after starting an activation process in a fuel cell activation process to allow the stack to be an open circuit voltage (OCV) state and stopping the supply of oxygen and hydrogen; electrically connecting adjacent cells among a plurality of cells forming the stack by a connecting part formed in a cell voltage sensing terminal board and shorting the adjacent cells to allow a cell voltage to be 0V; again supplying oxygen and hydrogen to the stack and performing a preconditioning process of applying current density of about 0.6 to 1.0 A/cm$^2$ for about 10 to 60 seconds; again decreasing the voltage to be 0V by applying current density of about 1.0 to 1.4 A/cm$^2$ for 30 to 180 seconds through the open circuit voltage state to remove oxygen remaining in the stack; and again supplying oxygen and hydrogen after a silent period has elapsed for about 30 to 300 seconds after removing the remaining oxygen. In particular, the time shorting the cell voltage to be 0V may be set to be less than about 5 seconds.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments of the present disclosure will be described in detail with reference to the accompanying drawings.

Figure 1:
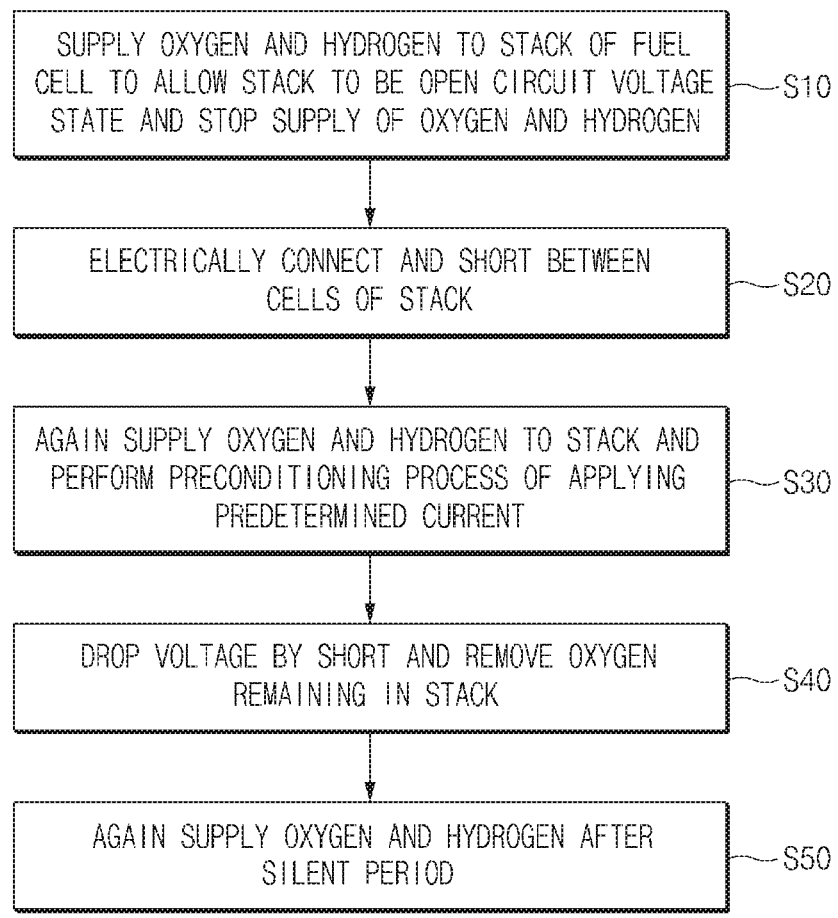
FIG. 1 is a flowchart illustrating a method for activating a stack of a fuel cell according to an exemplary embodiment of the present disclosure.

As illustrated in FIG. 1, a method for activating a stack of a fuel cell according to an exemplary embodiment of the present disclosure may include supplying oxygen and hydrogen to the stack of the fuel cell and terminating the supply of oxygen and hydrogen in a fuel cell activation process (S10), electrically connecting and shorting between adjacent cells of the stack (S20), re-supplying oxygen and hydrogen to the stack and applying a current (S30), decreasing a voltage by the short to remove oxygen remaining in the stack (S40), and re-supplying oxygen and hydrogen (S50).

Figure 2:
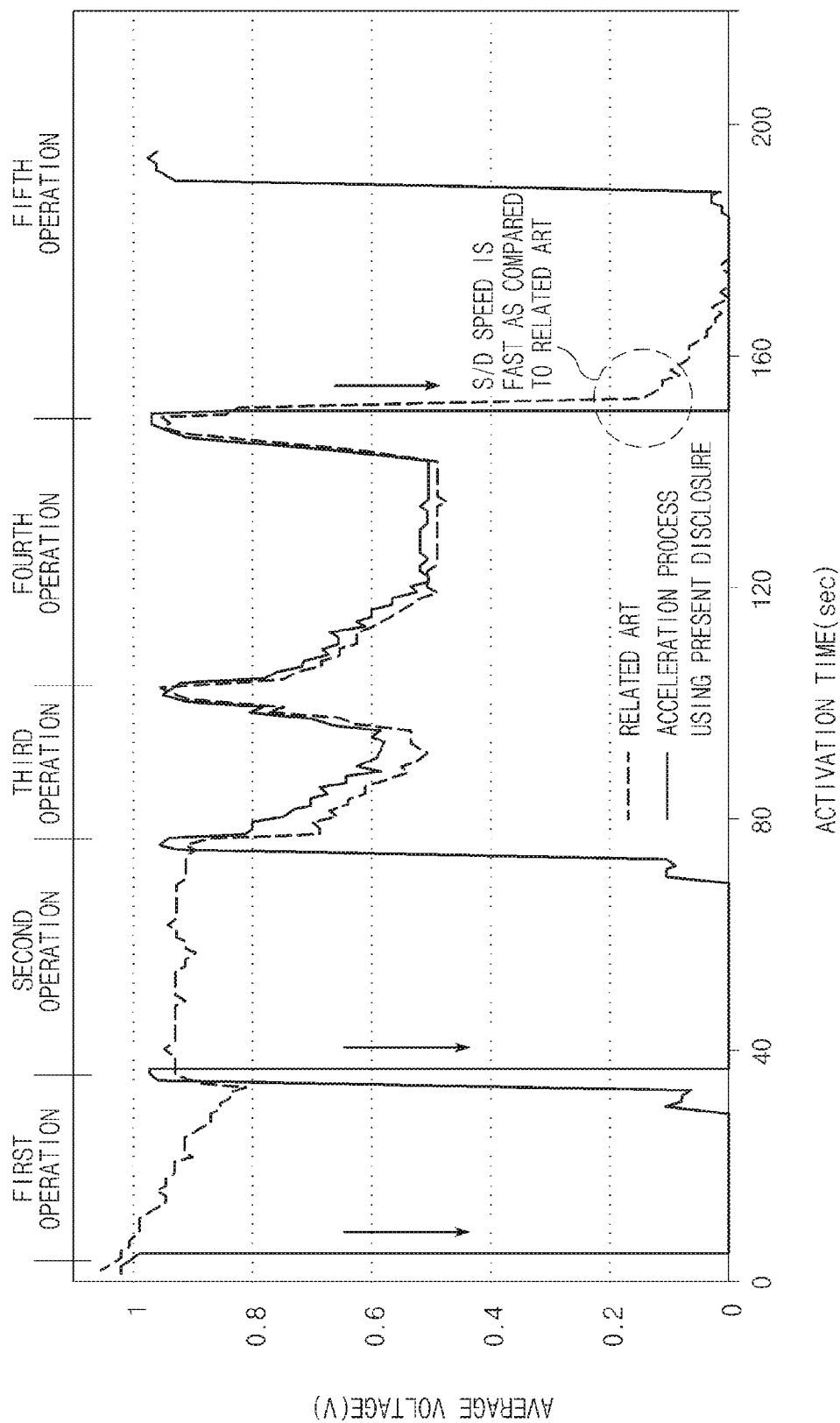
FIG. 2 is a graph illustrating an average voltage and an activation time of the method for activating a stack of a fuel cell according to an exemplary embodiment of the present disclosure and the related art.

As illustrated in FIGS. 1 and 2, in the start process (S10) of the method for activating a stack of a fuel cell according to the present disclosure, oxygen and hydrogen may be supplied to the stack forming the fuel cell after starting the activation process in the fuel cell activation process, thereby allowing the stack to be an open circuit voltage (OCV) state.

Further, when the stack becomes the open circuit voltage state, the short may be prepared by terminating the supply of oxygen and hydrogen. In particular, a cell voltage may be decreased (S20) to close to 0V by electrically connecting between adjacent cells (e.g., electrically connected adjacent cells) among a plurality of cells forming the stack using a cell voltage sensing terminal board and shorting between the adjacent cells which are connected to each other. The cell voltage sensing terminal board that connects the cells may have a connecting part (not illustrated) formed from a center to both ends to connect the adjacent cells to each other.

In the preconditioning process (S30), the preconditioning process may performed by resupplying oxygen and hydrogen to the stack and applying predetermined current density for a predetermined period of time after the decreasing of the cell voltage to close to 0V (S20). Particularly, the predetermined current density may be set to about 0.6 to 1.0 A/cm$^2$ to detect defective cells and confirm voltage stability in both low current density and high current density, and the predetermined period of time may be set to about 10 to 60 seconds to confirm voltage stability over a period of time. Specifically, the predetermined current may be set to about 360 A, and the predetermined period of time may be set to about 30 seconds.

In the removing of oxygen that remains in the stack (S40), the voltage may again be decreased to be about 0V by the short by applying current density exceeding the predetermined current density (e.g., about 0.6 to 1.0 A/cm$^2$) for a period of time exceeding the predetermined time (e.g., about 10 to 60 seconds) through the open circuit voltage state after performing the preconditioning process, to thus remove oxygen remaining in the stack. Particularly, the current density exceeding the predetermined current density may be set to about 1.0 to 1.4 A/cm$^2$ to obtain a mass transfer resistance reduction effect by swelling Nafion around catalyst by a high current pulse driving and causing a structural change of an electrode to change closed pore to open pore, and the period of time exceeding the predetermined time may be set to about 30 to 180 seconds to obtain a sufficient mass transfer resistance reduction effect. Specifically, a current exceeding the predetermined current of about 360 A may be set to about 432 A, and a period of time exceeding the predetermined time of about 30 seconds may be set to about 120 seconds.

Further, a short maintenance time shorting the cell voltage to be 0V may be set to less than about 5 seconds (e.g., a voltage decrease time may be set so as not to exceed about 5 seconds) in relation to hydrogen stoichiometry of 1.5 for Pt-Ox reduction and platinum/binder interface optimization by rapidly removing oxygen remaining in the stack by a rapid voltage decrease, and may be maintained to less than about 5 seconds when an amount of hydrogen stoichiometry used upon activation is not changed. Meanwhile, when the voltage is rapidly decreased forcedly by load application by substituting an external short method, a current of about 20 A may be applied. Particularly, the current application may be increased in proportion to an activation area in relation to the activation area of about 360 A/cm$^2$.

In the resupplying of oxygen and hydrogen (S50), after a silent period (e.g. shut down) has elapsed for a predetermined period of time after removing the remaining oxygen, oxygen and hydrogen may be resupplied to activate the stack. In particular, the predetermined period of time may be set to about 30 to 300 seconds to obtain a sufficient effect for increasing catalyst activation by removing mixed impurities or formed surface oxide in progress of manufacturing the electrode, and remaining organic solvents (IPA alcohols, propanol, and the like) from a surface during the silent period. Specifically, the predetermined time may be set to about 180 seconds. Silent period is shut down.

According to the present disclosure, the repeated decrease of the voltage by the short to remove oxygen remaining in the stack and the resupply of oxygen and hydrogen after the silent period may be repeated at least 11 times so that the stack of the fuel cell satisfies reference performance, thereby making it possible to accelerate the activation process. Particularly, the activation may be accelerated due to reduction speed of oxide on a Pt catalyst surface formed in the process of manufacturing an electrode separating plate in the cell being increased due to cathode over-voltage degradation, and oxygen remaining a cathode may be completely removed by Pt-Ox reduction and platinum/binder interface optimization.

In other words, according to the present disclosure, an activation process time may be decreased to about 75 minutes as much as a significant time by reducing a consumption time and the number of repeated times of an intermediate process compared to the related art, and marketability may be improved by reducing a consumption amount of hydrogen (e.g., the consumption amount of hydrogen may be changed based on the activation process time and the number of repeated times) to about 1.7 kilograms.

Accordingly, the method for activating a stack of a fuel cell may include supplying oxygen and hydrogen to the stack forming the fuel cell after starting the activation process in the fuel cell activation process to allow the stack to be the open circuit voltage (OCV) state and terminating the supply of oxygen and hydrogen (S10), electrically connecting adjacent cells among a plurality of cells forming the stack by a cell voltage sensing terminal board and shorting the adjacent cells to decrease a cell voltage to be 0V (S20), resupplying oxygen and hydrogen to the stack and performing a preconditioning process of applying a predetermined current for a predetermined time (S30), repeating a decrease of a voltage to be 0V by the short by applying current exceeding the predetermined current for a period of time exceeding the predetermined time through the open circuit voltage state to remove oxygen remaining in the stack (S40), and resupplying oxygen and hydrogen after a silent period has elapsed for a predetermined period of time after removing the remaining oxygen (S50).

After the cell voltage of the open circuit voltage state is decreased to about 0V by the method for shorting the adjacent cells of the fuel cell, the activation may be repeated, and oxygen remaining in the stack may be removed by rapidly decreasing the voltage using the short during the activation process to accelerate the activation process, thereby making it possible to reduce a time required for a fixing and to reduce the amount of hydrogen used for the activation.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for activating a stack of a fuel cell, comprising:
    supplying oxygen and hydrogen to the stack forming the fuel cell after starting an activation process in a fuel cell activation process to allow the stack to be an open circuit voltage (OCV) state and terminating the supply of oxygen and hydrogen;
    electrically connecting adjacent cells among a plurality of cells forming the stack by a cell voltage sensing terminal board and shorting the adjacent cells to decrease a cell voltage to be about 0V;
    resupplying oxygen and hydrogen to the stack and performing a preconditioning process of applying predetermined current density for a predetermined period of time;
    repeating a decrease of the voltage to be about 0V by the shorting by applying current density exceeding the predetermined current density for a period of time exceeding the predetermined period of time through the open circuit voltage state to remove oxygen remaining in the stack; and
    resupplying oxygen and hydrogen after a silent period has elapsed for a predetermined period of time after removing the remaining oxygen.

2. The method according to claim 1, wherein the predetermined current density is set to about 0.6 to 1.0 A/cm$^2$, and the predetermined time is set to about 10 to 60 seconds.

3. The method according to claim 2, wherein the current density exceeding the predetermined current density is set to about 1.0 to 1.4 A/cm$^2$, and the period of time exceeding the predetermined period of time is set to about 30 to 180 seconds.

4. The method according to claim 3, wherein the predetermined time in the resupply of oxygen and hydrogen is set to about 30 to 300 seconds.

5. The method according to claim 1, wherein the period of time of decreasing the cell voltage to be about 0V is set to be less than about 5 seconds.

6. The method according to claim 1, wherein by repeating the decrease of the voltage and the resupply of oxygen and hydrogen 11 times, an activation process time becomes about 75 minutes, and a consumption amount of hydrogen is reduced to about 1.7 kilograms.

7. The method according to claim 1, wherein the cell voltage sensing terminal board includes a connecting part formed from a center to both ends to connect the adjacent cells to each other.

8. A method for activating a stack of a fuel cell, comprising:
    supplying oxygen and hydrogen to the stack forming the fuel cell after starting an activation process in a fuel cell activation process to allow the stack to be an open circuit voltage (OCV) state and terminating the supply of oxygen and hydrogen;
    electrically connecting adjacent cells among a plurality of cells forming the stack by a connecting part formed in a cell voltage sensing terminal board and shorting the adjacent cells to decrease a cell voltage to be about 0V;
    resupplying oxygen and hydrogen to the stack and performing a preconditioning process of applying current density of about 0.6 to 1.0 A/cm$^2$ for about 10 to 60 seconds;
    repeating a decrease in the voltage to be about 0V by the shorting by applying current density of about 1.0 to 1.4

A/cm² for 30 to 180 seconds through the open circuit voltage state to remove oxygen remaining in the stack; and resupplying oxygen and hydrogen after a silent period has elapsed for about 30 to 300 seconds after removing the remaining oxygen.

9. The method according to claim 8, wherein the period of time for decreasing the cell voltage to be about 0V is set to be less than about 5 seconds.

* * * * *